(12) United States Patent
Chen

(10) Patent No.: US 10,286,940 B2
(45) Date of Patent: May 14, 2019

(54) CHILD STROLLER APPARATUS

(71) Applicant: Wonderland Nurserygoods Company Limited, Tuen Mun, N.T. (HK)

(72) Inventor: Shun-Min Chen, Tuen Mun (HK)

(73) Assignee: WONDERLAND NURSERYGOODS COMPANY LIMITED, Tuen Mun, N.T. (HK)

( * ) Notice: Subject to any disclaimer, the term of this patent is extended or adjusted under 35 U.S.C. 154(b) by 0 days.

(21) Appl. No.: 15/696,295

(22) Filed: Sep. 6, 2017

(65) Prior Publication Data
US 2018/0065654 A1    Mar. 8, 2018

(30) Foreign Application Priority Data
Sep. 6, 2016    (CN) .......................... 2016 1 0805447

(51) Int. Cl.
*B62B 7/08*    (2006.01)
*B62B 7/06*    (2006.01)

(52) U.S. Cl.
CPC .............. *B62B 7/062* (2013.01); *B62B 7/068* (2013.01); *B62B 7/08* (2013.01); *B62B 7/064* (2013.01); *B62B 2202/42* (2013.01); *B62B 2205/003* (2013.01); *B62B 2205/12* (2013.01); *B62B 2205/20* (2013.01); *B62B 2205/22* (2013.01)

(58) Field of Classification Search
CPC .. B62B 7/062; B62B 7/06; B62B 7/08; B62B 2205/20; B62B 2203/003
See application file for complete search history.

(56) References Cited

U.S. PATENT DOCUMENTS 6,767,028 B2 * 7/2004 Britton .................... B62B 7/044
                                                            280/47.38
7,237,795 B2 * 7/2007 Wu .......................... B62B 3/12
                                                            280/651

(Continued)

FOREIGN PATENT DOCUMENTS

| CN | 105398481 A | 3/2016 |
| EP | 1967439 A2 | 9/2008 |

(Continued)

OTHER PUBLICATIONS

The Search Report from co-pending EP Patent Application No. 17189619.4 dated Feb. 28, 2018.

*Primary Examiner* — Emma K Frick
(74) *Attorney, Agent, or Firm* — Baker & McKenzie LLP

(57) ABSTRACT

A child stroller apparatus includes a handle frame having a first side segment, a first leg frame having a second side segment, a second leg frame, a linkage assembly connected with the handle frame and the second leg frame, and a latching mechanism. The second side segment is connected with a joining part, and the first side segment is connected pivotally with the joining part. Moreover, a handle is disposed adjacent to the joining part and connected with the joining part. The latching mechanism includes a latch assembled with the second side segment, and a release actuator assembled adjacent to the handle and operatively connected with the latch. The latch can engage with the linkage assembly for locking the child stroller apparatus in an unfolded state, and the release actuator is operable to urge the latch to disengage from the linkage assembly for folding the child stroller apparatus.

22 Claims, 16 Drawing Sheets

(56) References Cited

U.S. PATENT DOCUMENTS

| | | | | |
|---|---|---|---|---|
| 7,543,840 B2* | 6/2009 | Lin | ............................ | B62B 3/02 280/38 |
| 7,632,035 B2* | 12/2009 | Cheng | ..................... | B62B 7/008 280/642 |
| 7,694,996 B2* | 4/2010 | Saville | .................... | B62B 7/062 280/47.38 |
| 7,832,756 B2* | 11/2010 | Storm | ..................... | B62B 7/062 280/642 |
| 8,408,580 B2* | 4/2013 | Liao | ........................ | B62B 7/086 280/642 |
| 8,419,025 B2* | 4/2013 | Chen | ........................ | B62B 7/10 280/47.36 |
| 8,870,213 B1* | 10/2014 | Xu | ............................ | B62B 7/08 280/642 |
| 8,894,090 B1* | 11/2014 | Chen | ....................... | B62B 7/086 280/47.38 |
| 8,985,616 B1* | 3/2015 | Chen | ....................... | B62B 7/062 280/47.38 |
| 9,090,277 B1* | 7/2015 | Chen | ....................... | B62B 7/086 |
| 9,096,250 B2* | 8/2015 | Cheng | ..................... | B62B 7/068 |
| 9,193,373 B2* | 11/2015 | Fjelland | .................... | B62B 7/08 |
| 9,216,755 B2* | 12/2015 | Eisinger | ................... | B62B 7/06 |
| 9,561,816 B2* | 2/2017 | Dowd | ....................... | B62B 7/08 |
| 9,637,154 B2* | 5/2017 | Liu | ...................... | E05D 11/1007 |
| 9,701,333 B2* | 7/2017 | Liu | ............................ | B62B 7/08 |
| 9,908,551 B2* | 3/2018 | Ransil | ....................... | B62B 7/08 |
| 9,981,678 B1* | 5/2018 | Chen | ....................... | B62B 7/068 |
| 10,000,226 B2* | 6/2018 | Yi | ........................... | B62B 7/062 |
| 2005/0098983 A1* | 5/2005 | Cheng | ....................... | B62B 7/08 280/642 |
| 2017/0072981 A1* | 3/2017 | Reichardt | ............... | B62B 7/062 |
| 2017/0297600 A1* | 10/2017 | Zhong | .................... | B62B 7/083 |

FOREIGN PATENT DOCUMENTS

| | | |
|---|---|---|
| EP | 2572957 A2 | 3/2013 |
| GB | 2515557 A | 12/2014 |
| WO | 2007134185 A2 | 11/2007 |

\* cited by examiner

CHILD STROLLER APPARATUS

CROSS-REFERENCE TO RELATED APPLICATION(S)

This patent application claims priority to China Patent Application No. 201610805447.5 filed on Sep. 6, 2016, which is incorporated herein by reference.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a rigid frame that can be folded for convenient storage or transport and unfolded for use. The construction adopted for the folding mechanism of the stroller apparatus plays an important role in the design of the stroller since it has to be safe and convenient to handle in different situations while not affecting the appealing aesthetics of the stroller.

In some existing construction, the stroller frame may typically include a front leg frame, a rear leg frame and a handle frame pivotally connected with one another via multiple joint structures. The multiple joint structures and may be dispersed at different locations on each of the left and right sides of the stroller frame, and may be associated with latch mechanisms that have to be unlocked before folding the stroller frame. As a result, a caregiver may need to use one hand for unlocking the latch mechanism, and another hand for grasping the stroller frame at a different location for folding the stroller frame. This may result in a stroller apparatus that is inconvenient to fold.

Therefore, there is a need for a child stroller apparatus that can be convenient to fold and unfold, and address at least the foregoing issues.

SUMMARY

The present application describes a child stroller apparatus that is easy to fold and unfold. According to one aspect, the child stroller apparatus includes a handle frame having a first side segment, a first leg frame having a second side segment, a second leg frame, a linkage assembly connected with the handle frame and the second leg frame, and a latching mechanism. The second side segment is connected with a joining part, and the first side segment is connected pivotally with the joining part. Moreover, a handle is disposed adjacent to the joining part and connected with the joining part. The latching mechanism includes a latch assembled with the second side segment, and a release actuator assembled adjacent to the handle and operatively connected with the latch. The latch can engage with the linkage assembly for locking the child stroller apparatus in an unfolded state, and the release actuator is operable to urge the latch to disengage from the linkage assembly for folding the child stroller apparatus.

According to another aspect, the child stroller apparatus includes a handle frame having a first side segment, a first and a second leg frame respectively having a second and a third side segment, a handle, a linkage assembly and a latching mechanism. The second side segment is fixedly connected with a joining part, and the first and third segments are respectively connected pivotally with the joining part, the joining part including at least two coupling portions respectively connected pivotally with the first and third side segments. The handle is disposed adjacent to the joining part and fixedly connected with the joining part, the two coupling portions and the handle at least partially delimiting an opening for passage of a caregiver's hand for grasping the handle. The linkage assembly is respectively connected with the handle frame, the first and second leg frames. The latching mechanism includes a latch assembled with the second side segment, and a release actuator that is assembled adjacent to the handle and is operatively connected with the latch, the latch being operable to engage with the linkage assembly for locking the child stroller apparatus in an unfolded state, and the release actuator being operable to urge the latch to disengage from the linkage assembly for movement of the child stroller apparatus between the unfolded state and a folded state.

DETAILED DESCRIPTION OF THE EMBODIMENTS

Figure 1:
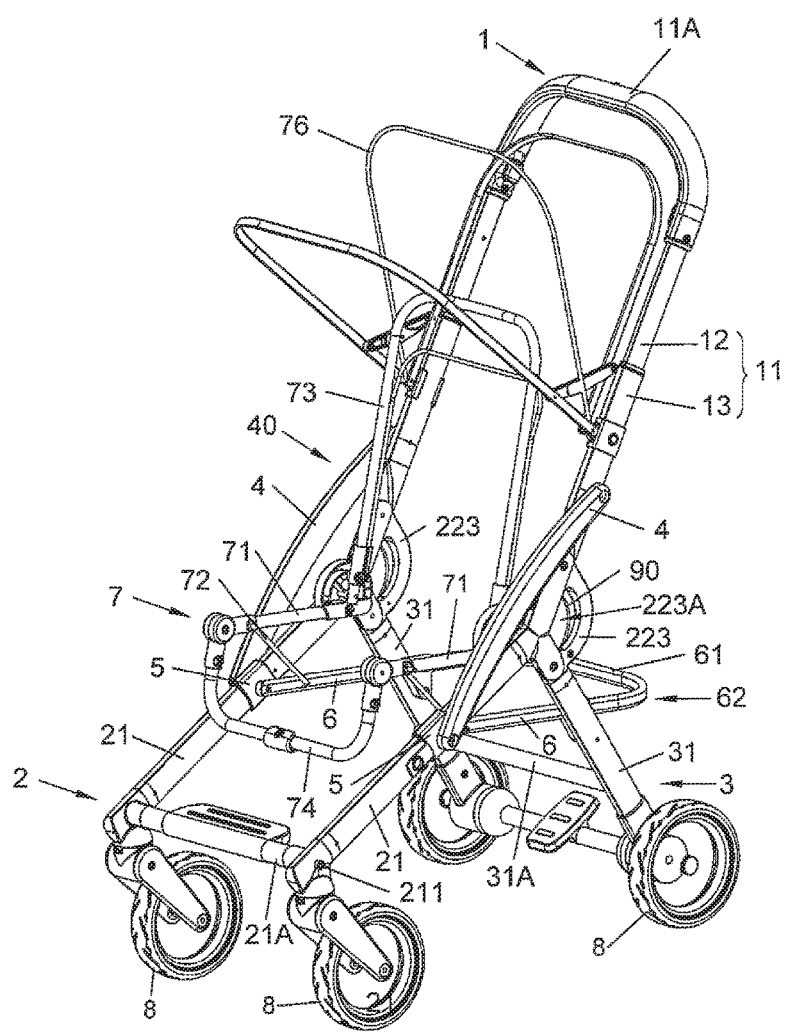
FIG. 1 is a perspective view illustrating an embodiment of a child stroller apparatus.
Figure 2:
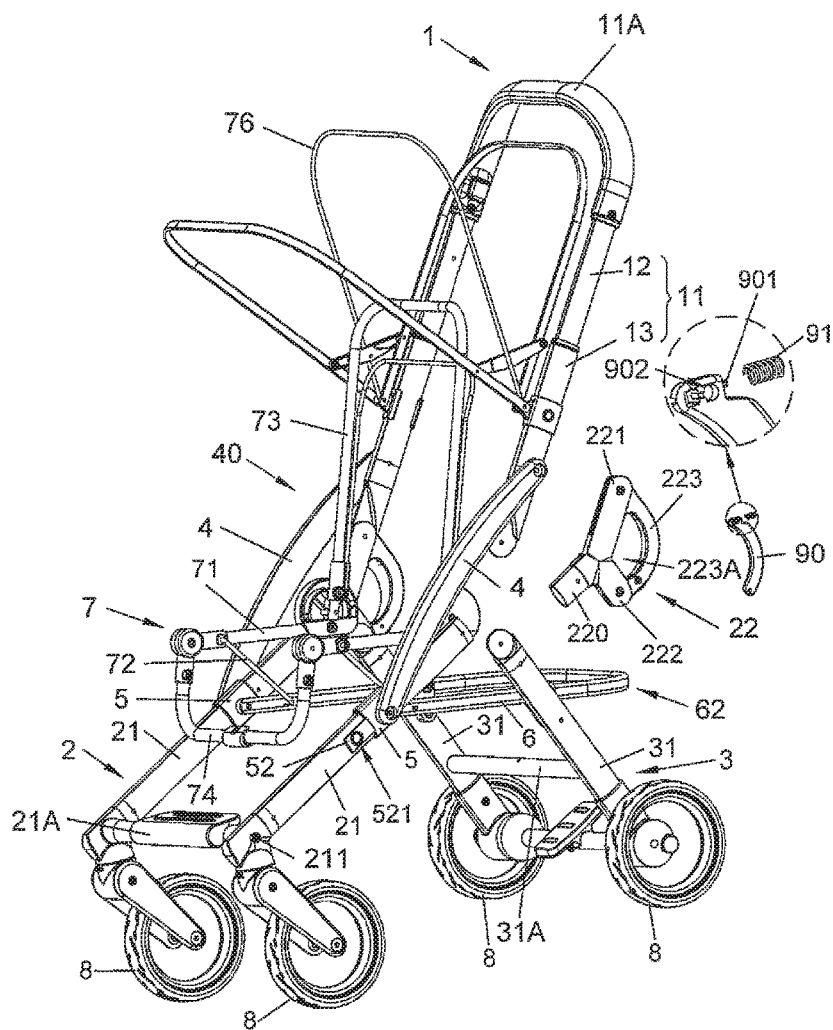
FIG. 2 is a partially exploded view of the child stroller apparatus shown in FIG. 1.

FIG. 1 is a perspective view illustrating an embodiment of a child stroller apparatus 100, and FIG. 2 is a partially exploded view of the child stroller apparatus 100. Referring to FIGS. 1 and 2, the child stroller apparatus 100 can include a handle frame 1, a front leg frame 2, a rear leg frame 3 and two joining parts 22. Each of the handle frame 1, the front leg frame 2 and the rear leg frame 3 can respectively have a generally symmetrical construction including two parallel side segments respectively disposed at a left and a right side of the child stroller apparatus 100, i.e., two side segments 11 for the handle frame 1, two side segments 21 for the front leg frame 2, and two side segments 31 for the rear leg frame 3. In addition, each of the handle frame 1, the front leg frame 2 and the rear leg frame 3 can include a transversal portion connected between the two parallel side segments, such as the transversal portion 11A between the two side segments 11, the transversal portion 21A between the two side segments 21, and the transversal portion 31A between the two side segments 31. The side segments 11, 21 and 31 and the transversal portions 11A, 21A and 31A can include, for example, tube portions. A plurality of wheels 8 can be respectively assembled with the front leg frame 2 and the rear leg frame 3, e.g., at lower ends of the side segments 21 and 31.

According to an example of construction, each side segment 11 of the handle frame 1 can further include a plurality of sub-segments assembled with one another, such as two sub-segments 12 and 13 slidably connected with each other. The sub-segments 12 can slide relative to the sub-segments 13 to shorten or expand the length of the handle frame 1.

The side segments 11, 21 and 31 at each of the left and right sides are connected with one joining part 22. The two joining parts 22 on the left and right sides are generally similar in construction, and allow relative rotation between the handle frame 1, the front leg frame 2 and the rear leg frame 3 for folding and unfolding the child stroller apparatus 100. Referring to FIGS. 1 and 2, the joining part 22 can include three coupling portions 220, 221 and 222 fixedly connected with one another. According to an implementation, the coupling portions 220, 221 and 222 may project in a divergent manner in three radially different directions. According to an example of construction, the joining part 22 including the three coupling portions 220, 221 and 222 may be formed integrally as a single part. The coupling portion 220 can be fixedly attached to an upper end of one side segment 21 of the front leg frame 2, the coupling portion 221 can be pivotally connected with a lower end of one side segment 11 of the handle frame 11 (in particular the sub-segment 13 thereof), and the coupling portion 222 can be pivotally connected with an upper end of one side segment 31 of the rear leg frame 3. With this assembly, the handle frame 1 and the rear leg frame 3 can respectively rotate relative to the front leg frame 2 and the joining parts 22 about two distinct pivot axes for folding and unfolding the child stroller apparatus 100.

Referring to FIGS. 1 and 2, a handle 223 can be disposed adjacent to and fixedly connected with the joining part 22 at each of the left and right sides. For example, the handle 223 can have a curved shape, and can have two opposite ends respectively connected fixedly with the two coupling portions 221 and 222. According to an example of construction, the handle 223 and the joining part 22 can be formed integrally as a single part. The handle 223 and the two coupling portions 221 and 222 can at least partially delimit an opening 223A sized to allow passage of a caregiver's hand for grasping the handle 223.

Referring to FIGS. 1 and 2, the child stroller apparatus 100 can further include a linkage assembly 40 respectively connected with the handle frame 1, the front leg frame 2 and the rear leg frame 3. The linkage assembly 40 can have a symmetrical construction including two side bars 4 and 6 and a sliding sleeve 5 respectively disposed at each of the left and the right side of the child stroller apparatus 100. The sliding sleeve 5 is assembled on the side segment 21 of the front leg frame 2 for sliding movement along the side segment 21. The side bar 4 can have two opposite ends respectively connected pivotally with the sliding sleeve 5 (e.g., on an outer side of the sliding sleeve 5) and the side segment 11 (e.g., the sub-segment 13) of the handle frame 1. The side bar 6 is respectively connected pivotally with the sliding sleeve 5 (e.g., on an inner side of the sliding sleeve 5) and the side segment 31 of the rear leg frame 3. Moreover, the two side bars 6 can be fixedly connected with a transversal segment 61, the side bars 6 and the transversal segment 61 thereby forming a basket frame 62 having a generally U-shape.

Referring to FIGS. 1 and 2, the child stroller apparatus 100 can further include a seat assembly 7 comprised of two seat bars 71, two support bars 72, a backrest frame 73 and a leg rest bar 74. The two seat bars 71 and the two support bars 72 can be disposed symmetrically on the left and right sides of the child stroller apparatus 100. The two seat bars 71 can be respectively connected pivotally with the two side segments 21 of the front leg frame 2 near the rear ends of the seat bars 71, and can be respectively connected with the two support bars 72 near the front ends of the seat bars 71. The two support bars 72 are further respectively connected pivotally with the two side bars 6. When the child stroller apparatus 100 is in an unfolded state, the two seat bars 71 can be thereby supported by the two side segments 21 of the front leg frame 2 and the two support bars 72 above the two side bars 6, as shown in FIG. 1.

With the aforementioned assembly, the rear leg frame 3 can be movably linked to the handle frame 1 via the side bars 6, the sliding sleeves 5 and the side bars 4. The sliding sleeves 5 can slide along the side segments 21 of the front leg frame 2 away from the joining parts 22 during folding of the child stroller apparatus 100, and toward the joining parts 22 during unfolding of the child stroller apparatus 100. Moreover, the seat bars 71 can be movably linked to the basket frame 62 via the support bars 72.

Referring again to FIGS. 1 and 2, the backrest frame 73 can have a generally U-shape, and can have two ends respectively assembled with the two side segments 21 of the front leg frame 2. The leg rest bar 74 can extend transversally between the two seat bars 71, and can be respectively connected with the front ends of the seat bars 71. Moreover, the child stroller apparatus 100 can further include a canopy frame 76 having two sides respectively assembled with the two side segments 11 of the handle frame 1, in particular the sub-segments 13 of the side segments 11.

The child stroller apparatus 100 can further include a latching mechanism operable to lock the child stroller apparatus 100 in the unfolded state for use. Referring to FIGS. 2 and 5-8, this latching mechanism can include a latch 92, a driving part 94, two springs 91 and 97, a release actuator 90 and a wire 93.

Figure 6:
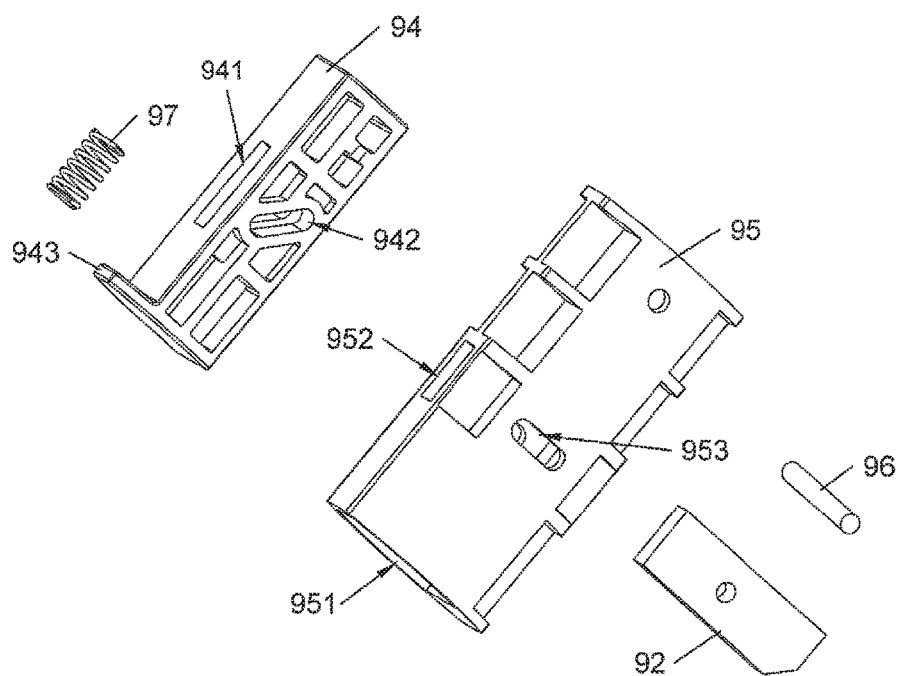
FIG. 6 is perspective view illustrating further construction details of the latching mechanism for locking the child stroller apparatus in an unfolded state.
Figure 8:
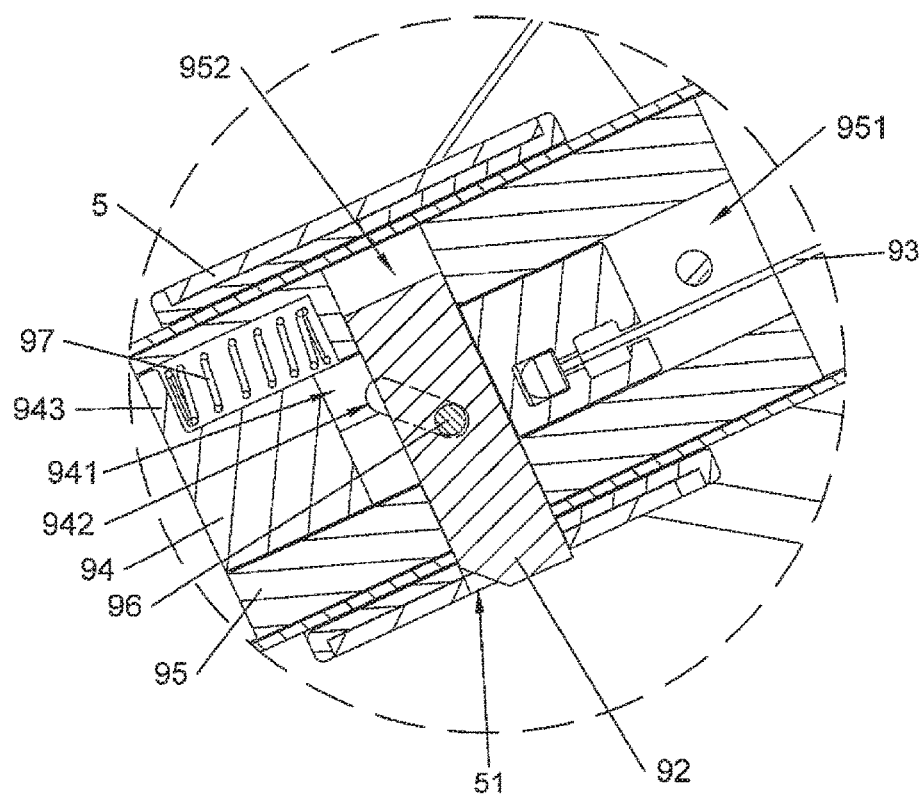
FIG. 8 is an enlarged view illustrating portion A shown in FIG. 7.

The latch 92 can engage with a portion of the linkage assembly 40 for locking the child stroller apparatus 100 in the unfolded state. Referring to FIGS. 6 and 8, the latch 92 can be assembled with one side segment 21 of the front leg frame 2 at a location distant from the joining part 22 for sliding movement substantially perpendicular to the side segment 21. For example, a support mount 95 having two slots 951 and 952 extending along two axes generally perpendicular to each other may be fixedly connected inside the side segment 21, and the latch 92 can be assembled for sliding relative to the side segment 21 and the support mount 95 through the slot 952 of the support mount 95. The slot 951 may extend generally in a same direction as the side segment 21, and the slot 952 may extend generally perpendicular to the side segment 21. In this manner, the latch 92 can slide to protrude outward through an opening provided on the side segment 21 for engaging with a locking opening 51 provided on the sliding sleeve 5, or retract toward an interior of the side segment 21 for disengaging from the locking opening 51 of the sliding sleeve 5. The engagement of the latch 92 with the sliding sleeve 5 can lock the sliding sleeve 5 in a position on the side segment 21 corresponding to the unfolded state of the child stroller apparatus 100. As a result, this engagement of the latch 92 with the sliding sleeve 5 can effectively lock the child stroller apparatus 100 in the unfolded state for use. When the latch 92 is disengaged from the sliding sleeve 5, the sliding sleeve 5 can slide on the side segment 21 for folding or unfolding the child stroller apparatus 100.

Referring to FIGS. 6 and 8, the driving part 94 can be assembled for sliding through the slot 951 of the support mount 95, whereby the driving part 94 can slide along a direction of extension of the side segment 21. Moreover, the driving part 94 can be assembled so that it is movably linked to the latch 92 via a sliding connection. According to an example of construction, the support mount 95 can include an elongated guide slot 953 extending parallel to the axis of displacement of the latch 92, the driving part 94 can include an inclined slot 942, and the latch 92 can be fixedly connected with a pin 96 that is respectively received slidably through the guide slot 953 of the support mount 95 and the inclined slot 942 of the driving part 94. In this sliding connection, the inclined slot 942 overlaps at least partially with the guide slot 953 and is titled an angle relative to the guide slot 953, so that sliding of the driving part 94 along the side segment 21 can cause the pin 96 and the latch 92 to slide in unison substantially perpendicular to the side segment 21 for engaging or disengaging the sliding sleeve 5. According to an implementation, the driving part 94 can further include a receiving cavity 941, and the latch 92 can be received at least partially in the receiving cavity 941 for a compact assembly.

Referring to FIGS. 6 and 8, the spring 97 can have two opposite ends respectively connected with the support mount 95 and the driving part 94. The connection of the spring 97 with the driving part 94 can be exemplary achieved with a protrusion 943 provided on the driving part 94. According to an implementation, the spring 97 may be a compression spring. The spring 97 can bias the driving part 94 in a direction for urging the latch 92 to a locking position for engagement with the sliding sleeve 5.

Figure 7:
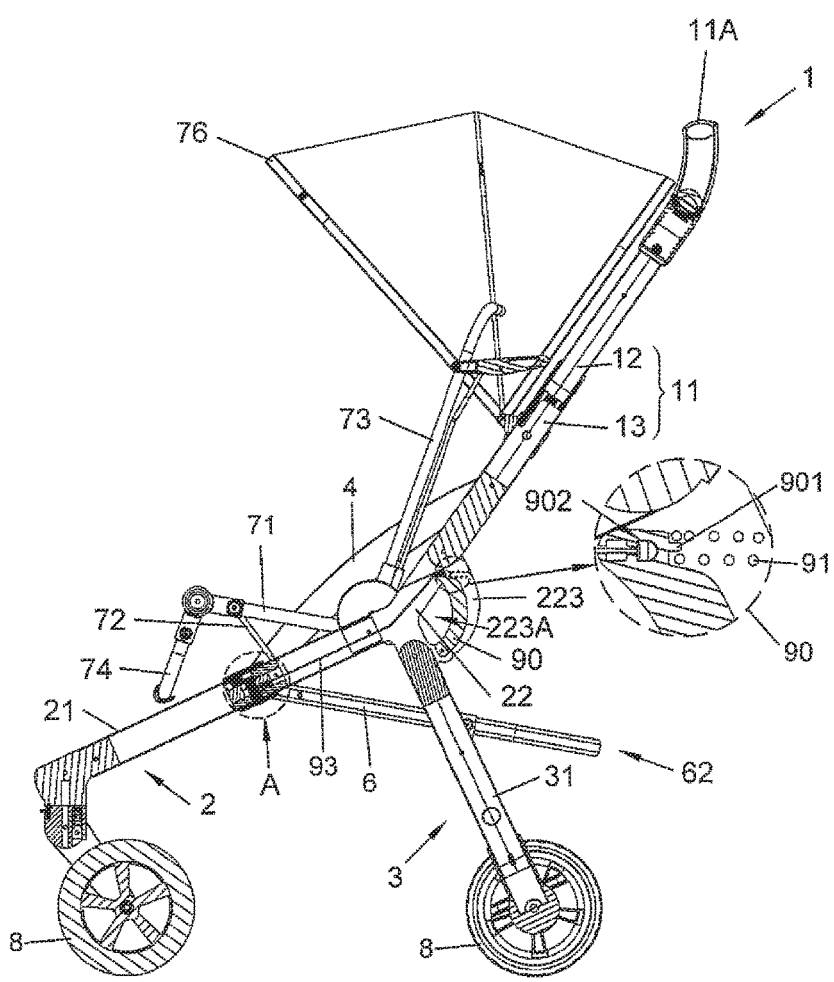
FIG. 7 is a cross-sectional view illustrating the assembly of the latching mechanism in the child stroller apparatus.

Referring to FIGS. 2, 7 and 8, the release actuator 90 can be assembled adjacent to the handle 223 and can be operatively connected with the latch 92 via the wire 93. The wire 93 can extend at least partially along an interior of the side segment 21 and an interior of the coupling portion 221 of the joining part 22, and have two opposite ends respectively anchored with the driving part 94 and an anchor opening 902 provided on the release actuator 90. Examples of materials for the wire 93 may include steel or any other suitable materials. The release actuator 90 can be movably assembled with the handle 223, and is operable to cause the latch 92 to move from the locking position to an unlocking position and thereby disengage from the sliding sleeve 5 for folding of the child stroller apparatus 100. According to an example of construction, the release actuator 90 may be pivotally connected with the handle 223, e.g., near a lower end portion of the handle 223. According to another example of construction, the release actuator 90 may be slidably connected with the handle 223. The release actuator 90 may be exposed at an inner side of the handle 223, i.e., inside the opening delimited by the handle 223 and the two coupling portions 221 and 222. According to an embodiment, the release actuator 90 may have an arc shape that at least partially matches with the shape of the handle 223 to facilitate grasping of the handle 223 and manual actuation of the release actuator 90.

The release actuator 90 can be further connected with the spring 91, which may have two opposite ends respectively connected with the handle 223 and an anchor protrusion 901 provided on the release actuator 90. According to an example of construction, the spring 91 may be a compression spring. The spring 91 can bias the release actuator 90 toward an initial position protruding outside the handle 223 at the inner side thereof.

Figure 3:
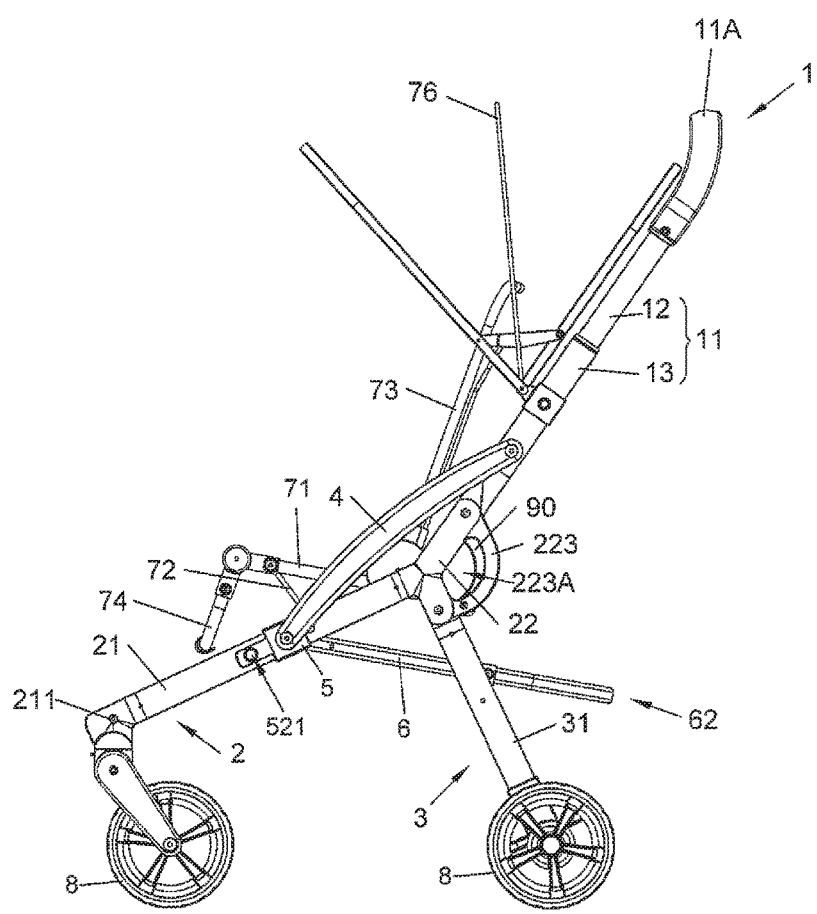
FIG. 3 is a side view of the child stroller apparatus shown in FIG. 1.
Figure 4:
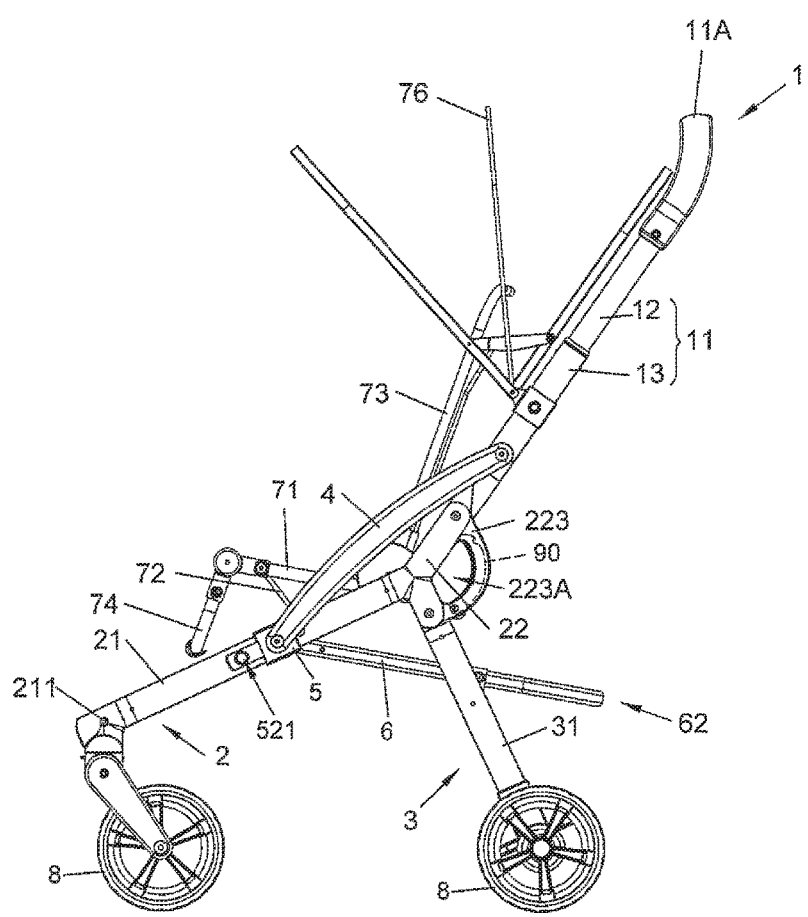
FIG. 4 is a side view schematically illustrating a release actuator provided in the child stroller apparatus in a depressed position for unlocking the child stroller apparatus.
Figure 5:
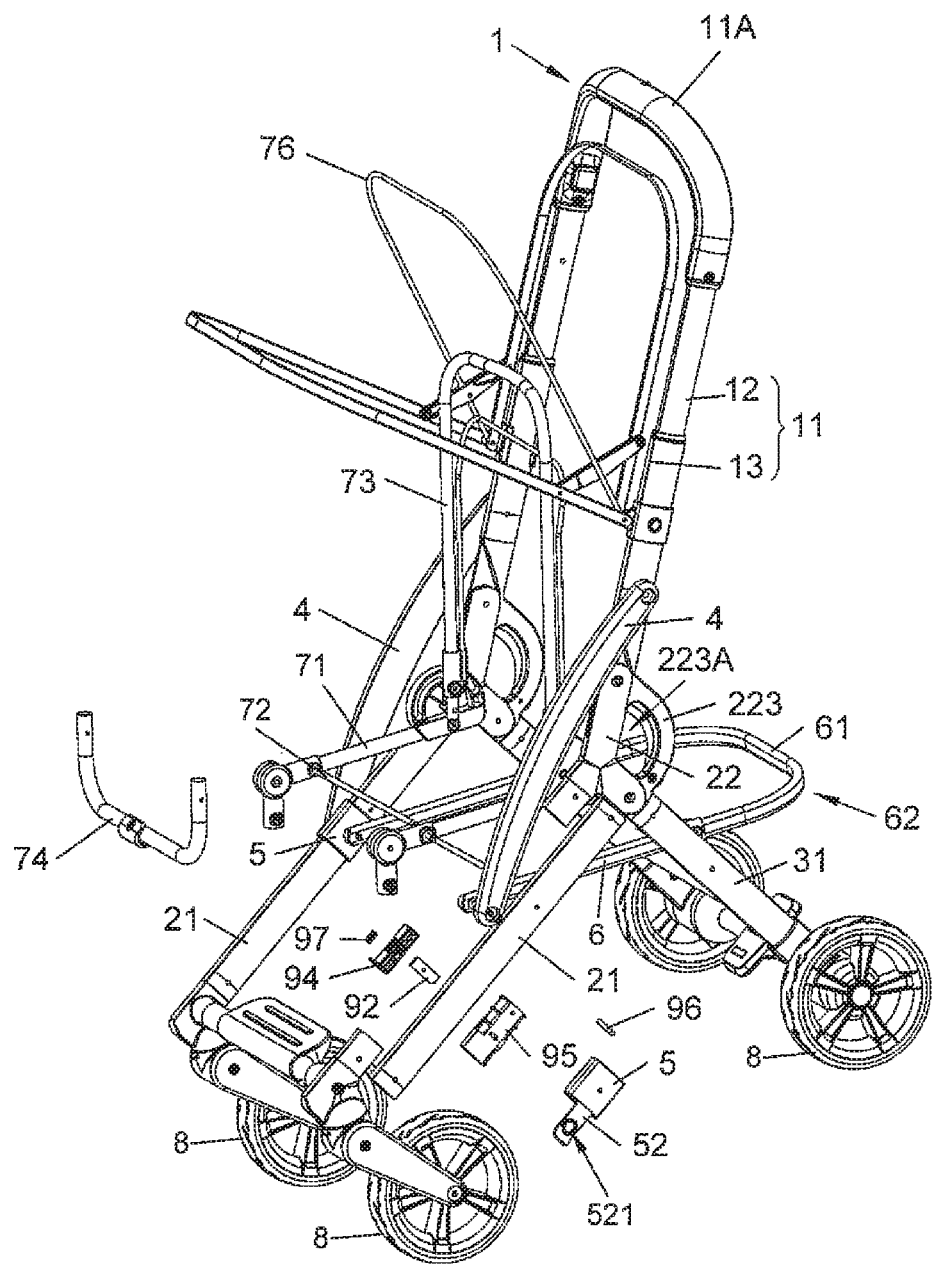
FIG. 5 is a partially exploded view illustrating a latching mechanism for locking the child stroller apparatus in an unfolded state.
Figure 9:
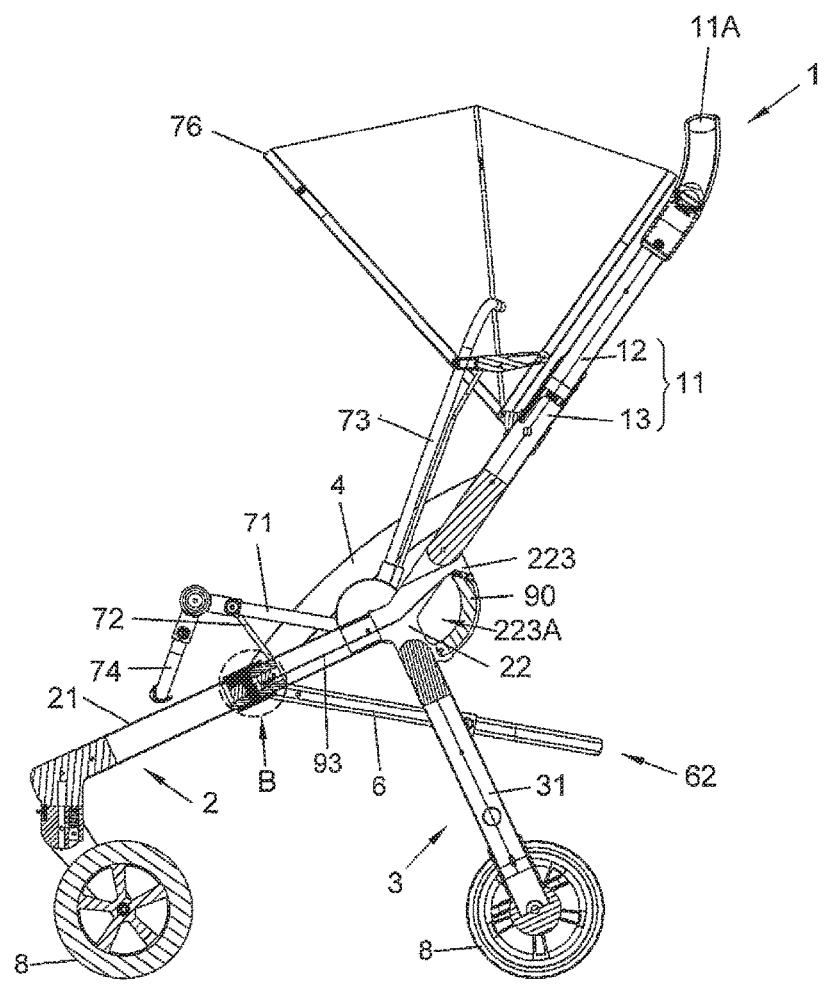
FIG. 9 is a cross-sectional view illustrating the latching mechanism in an unlocking state.

The release actuator 90 is movable relative to the handle 223 between the initial position shown in FIGS. 3 and 7 and a depressed position shown in FIGS. 4 and 9. While the child stroller apparatus 100 is in the unfolded state for use and no external action is applied on the release actuator 90, the biasing action applied by the spring 91 can keep the release actuator 90 in the initial position shown in FIGS. 3 and 7 wherein the release actuator 90 can protrude outside the handle 223 and inside the opening 223A. While the release actuator 90 remains in the initial position, the biasing action applied by the spring 97 can keep the driving part 94 in the position shown in FIG. 8 for maintaining the latch 92 in locking engagement with the locking opening 51 of the sliding sleeve 5, thereby locking the child stroller apparatus 100 in the unfolded state.

Figure 10:
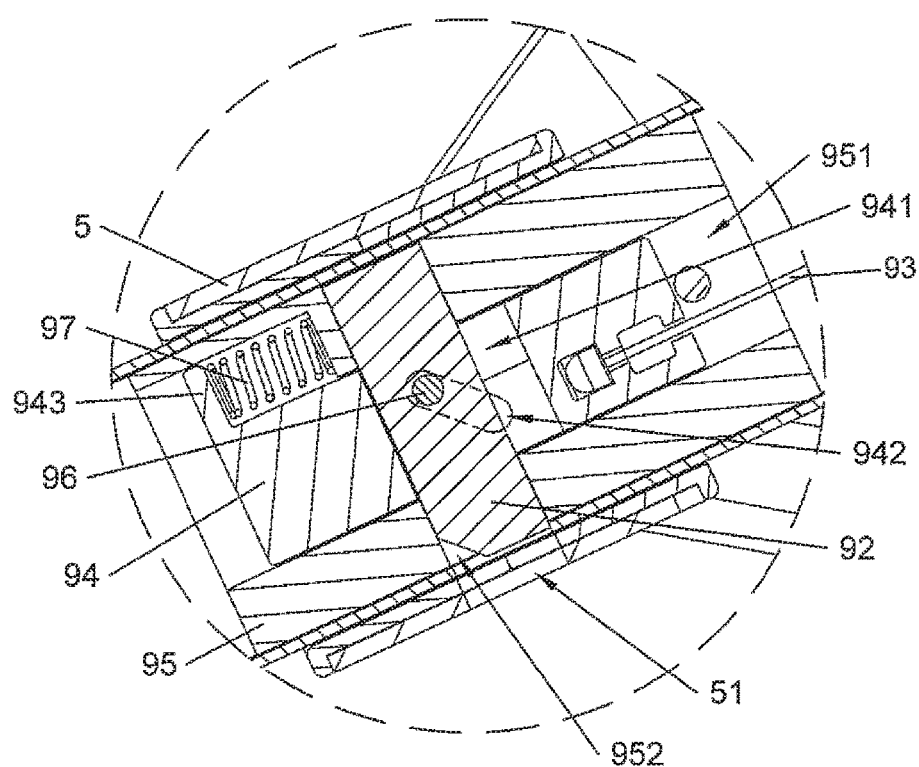
FIG. 10 is an enlarged view illustrating portion B shown in FIG. 9.

For folding the child stroller apparatus 100, a caregiver can use one hand to grasp the handle 223 and urge the release actuator 90 to move toward an interior of the handle 223 to the depressed position shown in FIGS. 4 and 9, which can urge the driving part 94 to slide relative to the side segment 21 from the position shown in FIG. 8 to the position shown in FIG. 10. Owing to the interaction between the pin 96 and the inclined slot 942, the sliding movement of the driving part 94 from the position of FIG. 8 to the position of FIG. 10 can urge the latch 92 to retract toward the interior of the side segment 21 and disengage from the locking opening 51 of the sliding sleeve 5. The child stroller apparatus 100 can be thereby unlocked for folding.

The same latching mechanism described above can be disposed symmetrically on each of the left and right sides to provide locking engagement with each sliding sleeve 5 for locking the child stroller apparatus 100 in the unfolded state.

According to some embodiment, the child stroller apparatus 100 may further include another latching mechanism for locking the child stroller apparatus 100 in the folded state. Referring to FIG. 2, this other latching mechanism can include a latch 211 provided on one side segment 21 of the front leg frame 2, and a locking opening 521 provided on the corresponding sliding sleeve 5. According to an example of construction, the latch 211 may be a protrusion provided on the side segment 21, and the locking opening 521 may be provided on a tongue 52 protruding downward from the sliding sleeve 5. The latch 211 may be disposed at a position spaced apart from the latch 92 and near the wheel 8 of the front leg frame 2, such that the latch 92 is located between the joining part 22 and the latch 211 along the side segment 21. As better shown in FIG. 16, when the child stroller apparatus 100 is fully folded, the latch 211 can engage with the locking opening 521 of the sliding sleeve 5 to lock the sliding sleeve 5 in position and prevents its sliding toward the joining part 22, whereby the child stroller apparatus 100 can be locked in the folded state. The aforementioned latch mechanism may be provided on one or two of the left and right sides of the child stroller apparatus 100.

Figure 11:
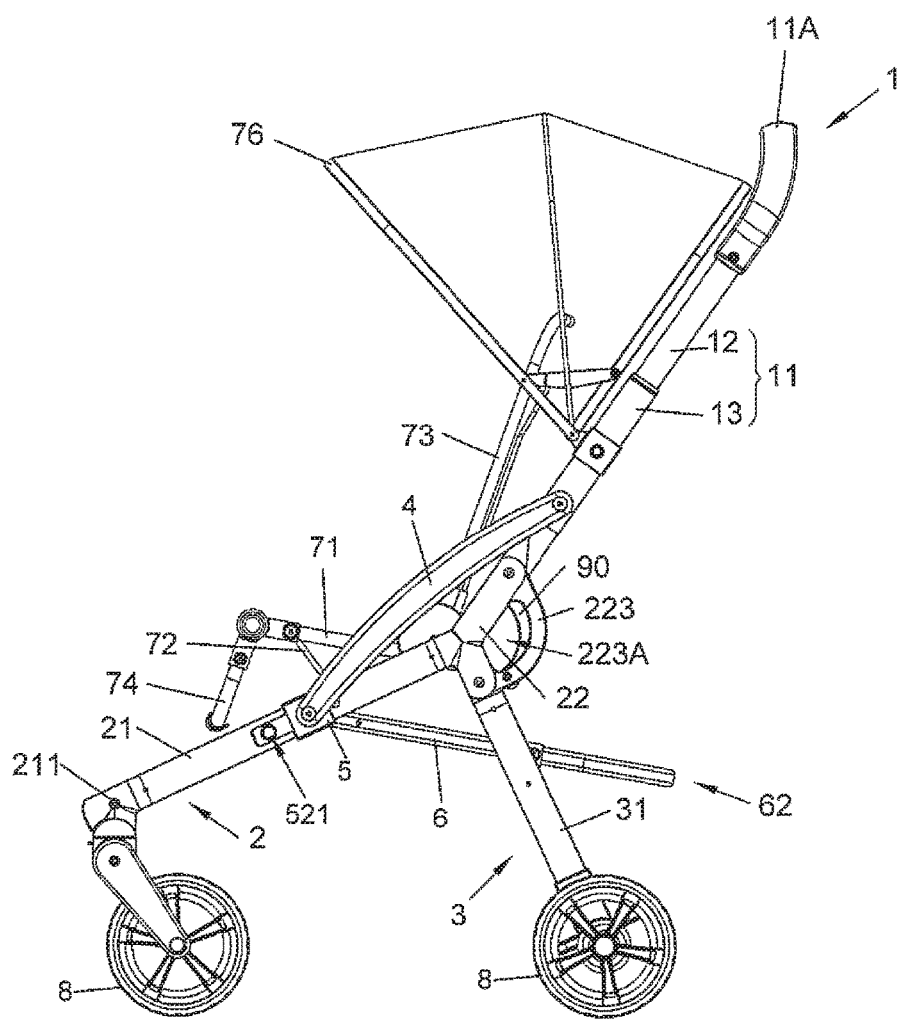
FIG. 11 is a side view illustrating the child stroller apparatus in an unfolded state.
Figure 12:
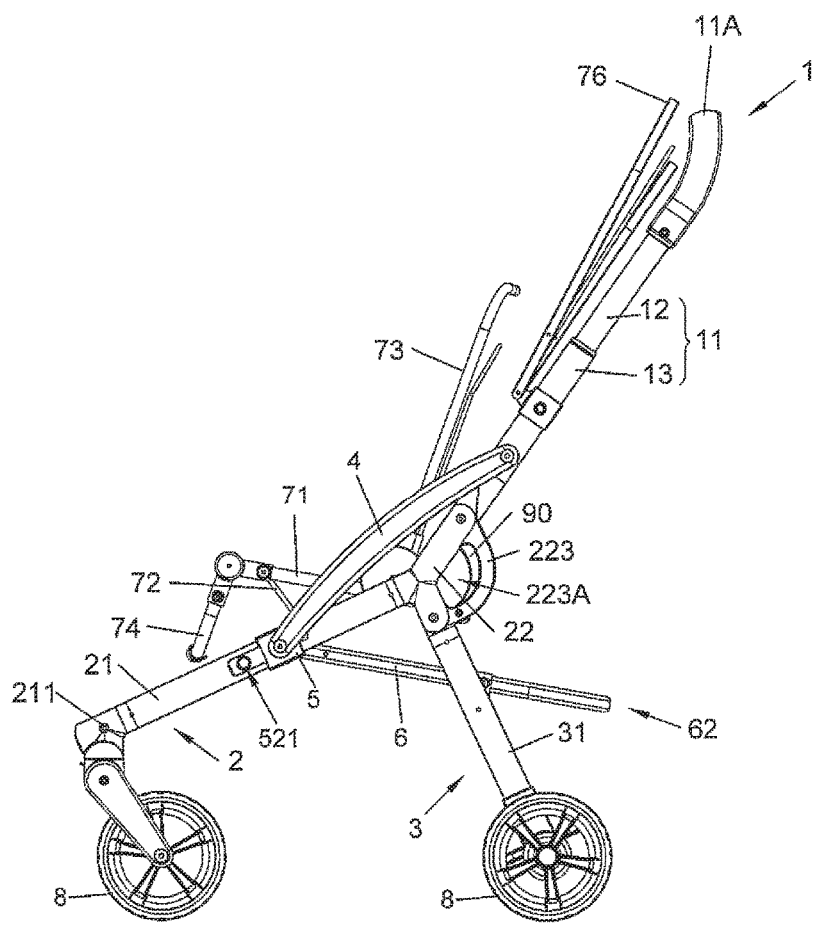
FIG. 12 is a side view illustrating the child stroller apparatus with a canopy frame thereof in a collapsed state.
Figure 13:
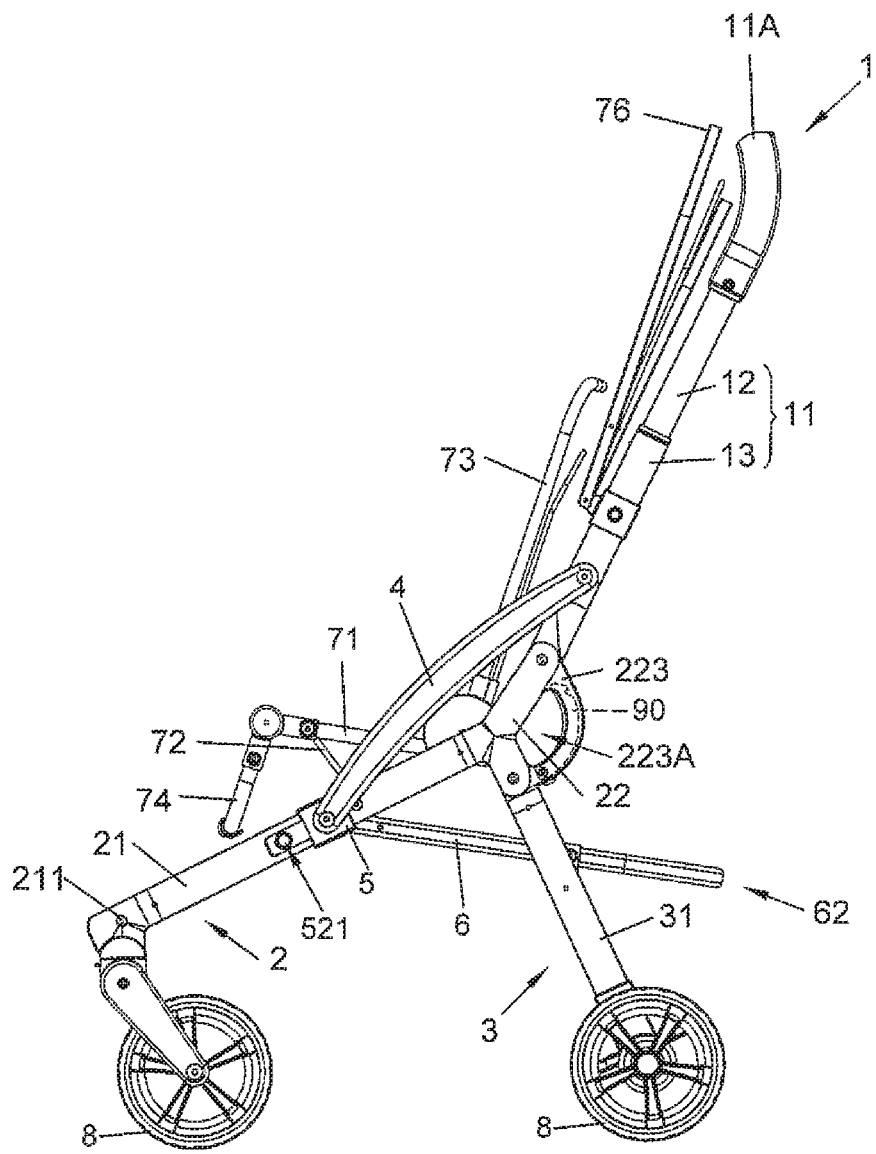
FIG. 13 is a side view illustrating the child stroller apparatus unlocked by operating a release actuator provided thereon.

In conjunction with FIGS. 1-10, reference is made hereinafter to FIGS. 11-15 to describe exemplary folding of the child stroller apparatus 100. In FIG. 11, the child stroller apparatus 100 is shown in the unfolded state for use. When the child stroller apparatus 100 is to be folded, the canopy frame 76 can be first collapsed as shown in FIG. 12. Then a caregiver can use each hand to grasp the handle 223 and press the release actuator 90 inward in a concurrent manner on each of the left and right sides of the child stroller apparatus 100. As a result, the release actuator 90 can move to the depressed position shown in FIG. 13, and cause the latch 92 to disengage from the sliding sleeve 5 and unlock the child stroller apparatus 100 like described previously.

Figure 14:
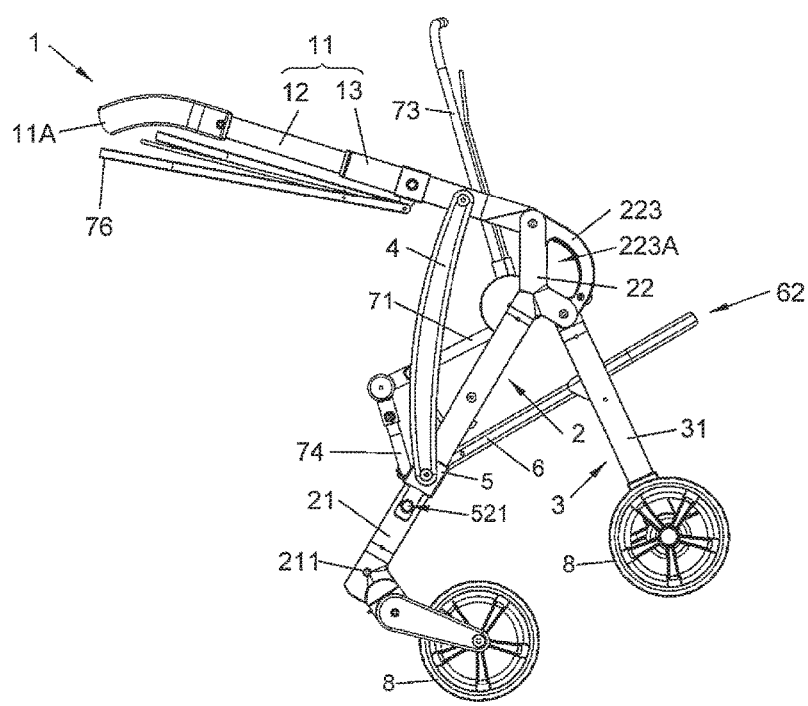
FIG. 14 is a side view illustrating the child stroller apparatus in an intermediate folded state.
Figure 15:
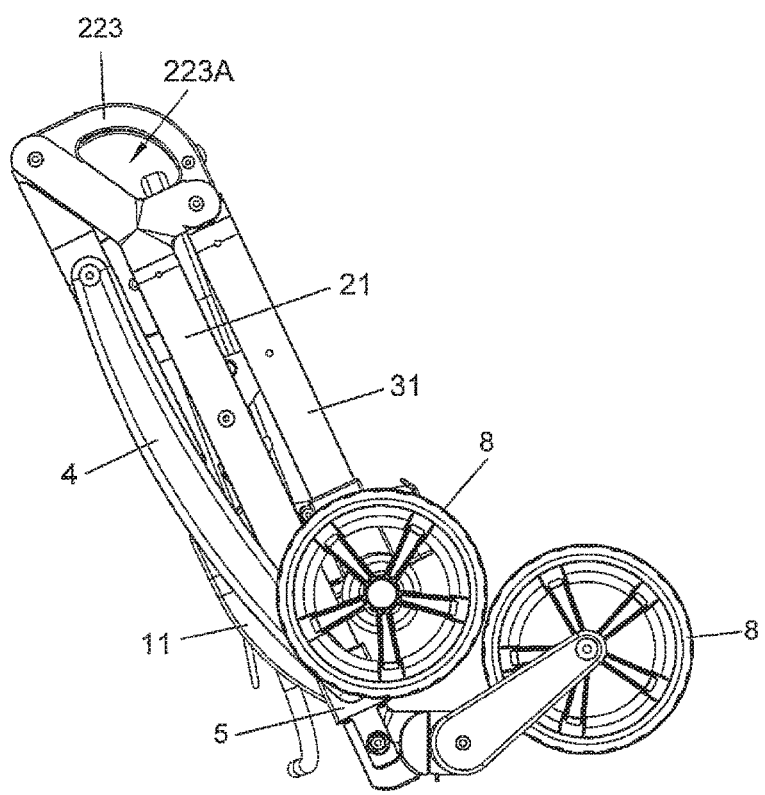
FIG. 15 is a side view illustrating the child stroller apparatus in a fully folded state.
Figure 16:
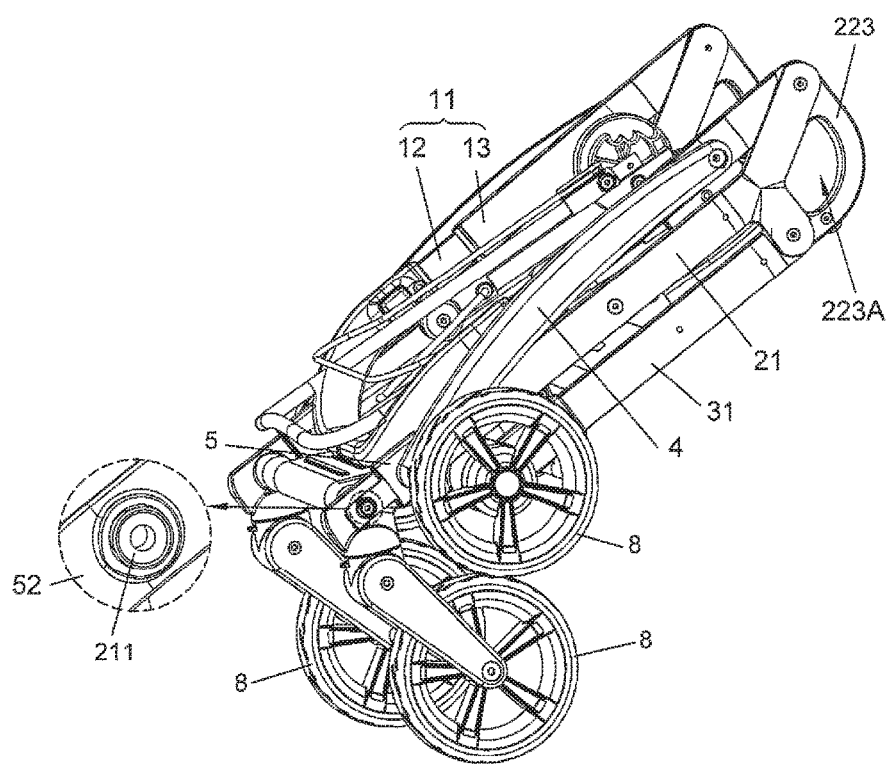
FIG. 16 is a perspective view illustrating the child stroller apparatus in the fully folded state.

While the release actuator 90 is kept in the depressed position, the caregiver then can lift the entire child stroller apparatus 100 above a floor surface with the two handles 223 on the left and right sides. As the child stroller apparatus 100 is lifted, gravity action can assist in folding the child stroller apparatus 100. In particular, the unlocked sliding sleeve 5 on each of the left and right sides can slide downward and away from the joining part 22 along the side segment 21 of the front leg frame 2, the handle frame 1 can rotate and fold forward, and the rear leg frame 3 can fold toward the front leg frame 2. This is schematically illustrated in FIG. 14, which represents the child stroller apparatus 100 in an intermediate folded state. When the child stroller apparatus 100 is fully folded as shown in FIGS. 15 and 16, the handle frame 1 and the rear leg frame 3 are positioned substantially adjacent and generally parallel to the front leg frame 2, and the sliding sleeve 5 can be located near a front end of the side segment 21 on each of the left and right sides. Moreover, the latch 211 can engage with the sliding sleeve 5 to lock the child stroller apparatus 100 in the folded state.

For unfolding the child stroller apparatus 100, the latch 211 can be depressed to disengage from the sliding sleeve 5. Then the handle frame 1 can be rotated rearward to unfold the child stroller apparatus 100, wherein the sliding sleeve 5 can slide along the side segment 21 toward the joining part 22 and the rear leg frame 3 can rotate away from the front leg frame 2 during unfolding of the handle frame 1. Once the child stroller apparatus 100 is fully unfolded, the latch 92 can engage with the sliding sleeve 5 as described previously for locking the child stroller apparatus 100 in the unfolded state.

Advantages of the construction described herein include the ability to provide a child stroller apparatus that is convenient to fold and unfold. The child stroller apparatus can include a handle and a release actuator that are placed adjacent to each other, so that a caregiver can easily use one hand to grasp the handle and operate the release actuator for unlocking the child stroller apparatus, and then lift the child stroller apparatus for its folding.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child stroller apparatus comprising:
a handle frame having a first side segment;
a first leg frame having a second side segment, and a second leg frame having a third side segment, wherein the second side segment is connected fixedly with a joining part, and the first side segment and the third side segment are respectively connected pivotally with the joining part;
a handle disposed adjacent to the joining part and connected fixedly with the joining part;
a linkage assembly connected with the handle frame, the first leg frame and the second leg frame; and
a latching mechanism including a latch assembled with the second side segment, and a release actuator that is assembled adjacent to the handle and is operatively connected with the latch, the latch being operable to engage with the linkage assembly for locking the child stroller apparatus in an unfolded state, and the release actuator being operable to urge the latch to disengage from the linkage assembly for movement of the child stroller apparatus between the unfolded state and a folded state;
wherein the joining part includes a first coupling portion pivotally connected with the first side segment, a second coupling portion fixedly connected with the second side segment, and a third coupling portion pivotally connected with the third side segment, the handle being respectively connected with the first and second coupling portions, the handle and the first and second coupling portions at least partially delimiting an opening for passage of a caregiver's hand for grasping the handle.

2. The child stroller apparatus according to claim 1, wherein the joining part including the first, second and third coupling portions are formed integrally as a single part.

3. The child stroller apparatus according to claim 1, wherein the linkage assembly comprises a sliding sleeve and a first and a second side bar, the sliding sleeve being assembled for sliding movement along the second side segment, the first side bar being respectively connected pivotally with the sliding sleeve and the first side segment, and the second side bar being respectively connected pivotally with the sliding sleeve and the third side segment, the latch engaging with the sliding sleeve to lock the child stroller apparatus in the unfolded state.

4. The child stroller apparatus according to claim 3, wherein the sliding sleeve slides away from the joining part during folding of the child stroller apparatus, and toward the joining part during unfolding of the child stroller apparatus.

5. The child stroller apparatus according to claim 3, further comprising a second latch disposed on the second side segment, the second latch engaging with the sliding sleeve for locking the child stroller apparatus in the folded state.

6. The child stroller apparatus according to claim 3, further comprising a seat assembly including a seat bar, a support bar and a backrest frame, the seat bar being respectively connected pivotally with the second side segment and the support bar, the support bar being further pivotally connected with the second side bar.

7. The child stroller apparatus according to claim 1, wherein the release actuator is movable relative to the handle between an initial position where the release actuator protrudes outside the handle, and a depressed position where the release actuator is displaced toward an interior of the handle, the release actuator moving from the initial position to the depressed position for unlocking the child stroller apparatus.

8. The child stroller apparatus according to claim 7, wherein the latching mechanism further comprises a spring respectively connected with the release actuator and the handle, the spring biasing the release actuator toward the initial position.

9. The child stroller apparatus according to claim 1, wherein the release actuator is pivotally connected with the handle.

10. The child stroller apparatus according to claim 1, wherein the latching mechanism further comprises a driving part that is movably linked to the latch via a sliding connection, and a wire that is respectively connected with the driving part and the release actuator.

11. The child stroller apparatus according to claim 10, wherein the driving part is assembled with the second side segment for sliding along a direction of extension of the second side segment, and the latch is assembled with the second side segment for sliding substantially perpendicular to the second side segment.

12. The child stroller apparatus according to claim 11, wherein the sliding connection includes an inclined slot provided on the driving part, and a pin fixedly connected with the latch and slidably received through the inclined slot.

13. The child stroller apparatus according to claim 10, wherein the latching mechanism further comprises a second spring connected with the driving part, the second spring biasing the driving part in a direction for urging the latch to a locking position.

14. A child stroller apparatus comprising:
a handle frame having a first side segment;
a first and a second leg frame respectively having a second and a third side segment, wherein the second side segment is fixedly connected with a joining part, and the first and third segments are respectively connected pivotally with the joining part, the joining part including at least two coupling portions respectively connected pivotally with the first and third side segments;
a handle disposed adjacent to the joining part and fixedly connected with the joining part, the two coupling portions and the handle at least partially delimiting an opening for passage of a caregiver's hand for grasping the handle;
a linkage assembly respectively connected with the handle frame, the first and second leg frames; and
a latching mechanism including a latch assembled with the second side segment, and a release actuator that is assembled adjacent to the handle and is operatively connected with the latch, the latch being operable to engage with the linkage assembly for locking the child stroller apparatus in an unfolded state, and the release actuator being operable to urge the latch to disengage from the linkage assembly for movement of the child stroller apparatus between the unfolded state and a folded state.

15. The child stroller apparatus according to claim 14, wherein the release actuator is movable relative to the handle between an initial position where the release actuator protrudes outside the handle and inside the opening, and a depressed position where the release actuator is displaced toward an interior of the handle, the release actuator moving from the initial position to the depressed position for unlocking the child stroller apparatus.

16. The child stroller apparatus according to claim 14, wherein the linkage assembly comprises a sliding sleeve and a first and a second side bar, the sliding sleeve being assembled for sliding movement along the second side segment, the first side bar being respectively connected pivotally with the sliding sleeve and the first side segment, and the second side bar being respectively connected pivotally with the sliding sleeve and the third side segment, the latch engaging with the sliding sleeve to lock the child stroller apparatus in the unfolded state.

17. The child stroller apparatus according to claim 14, wherein the joining part and the handle are formed integrally as a single part.

18. The child stroller apparatus according to claim 14, wherein the latching mechanism further comprises a driving part that is movably linked to the latch via a sliding connection, and a wire that is respectively connected with the driving part and the release actuator.

19. A child stroller apparatus comprising:
a handle frame having a first side segment;
a first leg frame having a second side segment, and a second leg frame, wherein the second side segment is connected with a joining part, and the first side segment is connected pivotally with the joining part;
a handle disposed adjacent to the joining part and connected with the joining part;
a linkage assembly connected with the handle frame and the second leg frame; and
a latching mechanism including a latch assembled with the second side segment, and a release actuator that is assembled adjacent to the handle and is operatively connected with the latch, the latch being operable to engage with the linkage assembly for locking the child stroller apparatus in an unfolded state, and the release actuator being operable to urge the latch to disengage from the linkage assembly for movement of the child stroller apparatus between the unfolded state and a folded state, wherein the release actuator is movable relative to the handle between an initial position where the release actuator protrudes outside the handle, and a depressed position where the release actuator is displaced toward an interior of the handle, the release actuator moving from the initial position to the depressed position for unlocking the child stroller apparatus.

20. The child stroller apparatus according to claim 19, wherein the joining part and the handle are formed integrally as a single part.

21. The child stroller apparatus according to claim 19, wherein the second leg frame has a third side segment, and the joining part includes a first coupling portion pivotally connected with the first side segment, a second coupling portion fixedly connected with the second side segment, and a third coupling portion pivotally connected with the third side segment, the handle being respectively connected with the first and second coupling portions, the handle and the first and second coupling portions at least partially delimiting an opening for passage of a caregiver's hand for grasping the handle.

22. The child stroller apparatus according to claim 19, wherein the latching mechanism further comprises a spring respectively connected with the release actuator and the handle, the spring biasing the release actuator toward the initial position.

* * * * *